United States Patent [19]

Roemer et al.

[11] Patent Number: 5,577,255

[45] Date of Patent: Nov. 19, 1996

[54] METHOD FOR TRANSMITTING INFORMATION PRESENT AT A PLURALITY OF DATA INTERFACES OF A PROCESSOR-CONTROLLED EQUIPMENT TO THE PROCESSING DEVICE THEREOF

[75] Inventors: Wilfried Roemer; Hans-Juergen Riemann, both of Berlin, Germany

[73] Assignee: Siemens Aktiengesellschaft, Munich, Germany

[21] Appl. No.: 523,590

[22] Filed: Sep. 5, 1995

Related U.S. Application Data

[63] Continuation of Ser. No. 273,163, Jul. 25, 1994, abandoned, which is a continuation of Ser. No. 795,007, Nov. 18, 1991, abandoned.

[30] Foreign Application Priority Data

Nov. 27, 1990 [DE] Germany .................. 40 37 723.7

[51] Int. Cl.⁶ ................................................ G06F 13/26
[52] U.S. Cl. ................ 395/737; 395/738; 395/739; 395/733; 364/241.2; 364/242.6; 364/242.92; 364/DIG. 1
[58] Field of Search ........................ 395/800, 737, 395/738, 739, 733; 364/241.2, 242.6, 242.92

[56] References Cited

U.S. PATENT DOCUMENTS

| 3,949,371 | 4/1976 | Pederzini | 340/172.5 |
|---|---|---|---|
| 3,984,820 | 10/1976 | Stanley et al. | 340/172.5 |
| 3,988,719 | 10/1976 | Whitby et al. | 340/172.5 |
| 4,336,588 | 6/1982 | Vernon et al. | 364/200 |
| 4,348,725 | 9/1982 | Farrell et al. | 364/300 |
| 4,446,341 | 5/1984 | Rubin | 179/175.2 |
| 4,897,833 | 1/1990 | Kent et al. | 370/85.2 |
| 4,914,580 | 4/1990 | Jensen et al. | 364/200 |
| 5,025,370 | 6/1991 | Koegel et al. | 364/200 |

FOREIGN PATENT DOCUMENTS

| 3912230 | 10/1990 | Germany . |
|---|---|---|
| 3922907 | 1/1991 | Germany . |

*Primary Examiner*—Frank J. Asta
*Attorney, Agent, or Firm*—Hill, Steadman & Simpson

[57] ABSTRACT

Information or data, particularly test data, present at a plurality of data interfaces, realized by V.24 interfaces and arranged in an interface equipment, are transferred into intermediate memories. The data interfaces can be assigned to one or more interrupt levels. As a result of the interface-associated monitoring of the data interfaces, the presence of information at the data interfaces is recognized and indicated to an interface testing device by communicating an interrupt request of a processor. As a result, an interface sampling routine assigned to the respective interrupt level is initialized. The data interfaces assigned to an interrupt level are cyclically sampled with the assistance of a respective interface sampling routine until information are no longer present and the information or data are respectively transferred into the assigned intermediate memory.

3 Claims, 2 Drawing Sheets

METHOD FOR TRANSMITTING INFORMATION PRESENT AT A PLURALITY OF DATA INTERFACES OF A PROCESSOR-CONTROLLED EQUIPMENT TO THE PROCESSING DEVICE THEREOF

This is a continuation of application Ser. No. 08/273,163, filed Jul. 25, 1994, abandoned, which is a continuation of application Ser. No. 07/795,007, filed Nov. 18, 1991, abandoned.

BACKGROUND OF THE INVENTION

1. Field of the Invention

The present invention relates to data interfaces, and more particularly to data interfaces for integrated-services digital network communication systems.

2. Description of the Prior Art

Data interfaces are provided in integrated-services digital network (ISDN) communication systems for the connection of data terminal equipment to the communication systems. These data terminal equipment and, consequently, the communication systems predominantly comprise V.24 interfaces. The physical and procedural properties of the V.24 interface correspond to the V.24 recommendation standardized by the CCITT (Comite Consultatif International des Telegraphique et Telephonique). The data exchange between data terminal equipment and data transmission equipment or, respectively, a communication system occurs via a V.24 interface. In communication systems, particularly in public or private switching equipment, the V.24 interface is realized directly at the switching equipment or in remote communication adapters. Two data terminal equipment connected directly to the communication system or to the appertaining communication adapters are switched by automatic or manual call set-up procedures with the assistance of the switching equipment or, respectively, are connected to one another for the purpose of a data exchange. The automatic call set-up procedure is implemented via interface circuits provided for this purpose and the manual call set-up procedure can be implemented with the assistance of push button sets arranged in the data terminal equipment, or separate peripheral equipment.

Furthermore, communication systems or, respectively, switching equipment, frequently comprise a V2.4 data interface for the connection of administration and maintenance terminal equipment. The administration and maintenance functions, such as, for example, changes of authorization, selection procedures, and transmission rates for the individual subscriber terminals, are realized with the assistance of the administration and maintenance terminal equipment. In addition, the error recognition and error localization procedures are controlled with the administration and maintenance terminal equipment.

A test of these interfaces is usually implemented in such a manner that a respective testing device is connected to, for example, two data interfaces realized by V.24 interfaces and a connection to another testing device is set up by a testing equipment. Subsequently, information from one testing device are transmitted via two data interfaces and the switching system to the other testing device, and the received information are checked with respect to occurring errors. The corresponding administration and maintenance measures and settings are effected by a further testing device connected to the V.24 administration and maintenance interface. To this end, a corresponding test program or, respectively, user program is required in each of the testing devices and is realized, for example, by a personal computer or a data terminal. Since only one V.24 interface can be constantly controlled or, respectively, sampled with the traditional personal computers or, respectively, terminals, a personal computer or, respectively, a data terminal must be provided for each V.24 interface, even though a plurality of V.24 interfaces are present for the connection of different data equipment, such as, for example, printers, data transmission equipment, etc.

SUMMARY OF THE INVENTION

An object of the present invention, therefore, is to provide a single testing device, for example a personal computer, such that a plurality of data interfaces having differing data or, respectively, information flow, can be tested in parallel.

The invention provides a method for transmitting information present at a plurality of serial data interfaces of a processor-control equipment to a processor device thereof, whereby the data interfaces are respectively realized with the assistance of an interface equipment and are respectively connected to the processor bus formed of control, data and address lines and also respectively comprise an interrupt output indicating the presence of information at the data interface thereof. The method more specifically provides the allocation of the interrupt inputs of the interface equipment to at least one interrupt level and the interrupt outputs to an interrupt level, respectively, that are conducted to an input comprising a given priority in an interrupt controller with whose assistance, given the presence of interrupt requests at at least one of its inputs. The interrupt requests having the respective highest priority are successively connected to the processing device via an interrupt connection provided for this purpose and via the processor bus, whereby an interface sampling routine identically realized in program-oriented terms is provided in the processor device for each interrupt level. More specifically, an interface list or interface sampling routine is chained in the manner of a ring for the interface equipment assigned to the respective interrupt level and is established with the assistance of a user test program, and furthermore the data interfaces are successively sampled for the presence of information according to the interface list or sampling routine and, given the presence of information, the information are transferred into an intermediate memory assigned to the respective interface equipment. In each sampling event, a counter is set to an initial counter reading given the presence of information. The counter reading is modified by a given number in response to the absence of information and ceases the sampling of the data interfaces upon attaining a given counter reading. With the foregoing, a currently-sequencing interface sampling routine can be interrupted by another interface sampling routine initiated by the interrupt controller insofar as the interrupt level assigned thereto has a higher priority.

A critical aspect of the invention may be seen in that data interfaces having the same rank such as, for example, data interfaces for the information exchange or data interfaces for the transmission of administration and maintenance or, respectively, reliability-oriented information are combined with the assistance of an interrupt controller to form an interrupt level having a given priority, and the presence of information at these data interfaces is reported to the processor device. The interface sampling routine is implemented in the processor device for each interrupt level, the data interface equipment respectively belonging to this interrupt level being cyclically sampled with the assistance of the interface sampling routine for the presence of information, i.e. data until information are no longer present at the data interfaces and, given the presence of information, such information are transferred into the intermediate memories. When presence of information of a data interface is indicated that is assigned to an interrupt level having a higher priority, then the currently-sequencing interface sampling routine is interrupted, and the appertaining interface sampling routine is initialized.

The interrupted interface sampling routine is further processed after the termination of the interface sampling routine. The data interfaces or, respectively, interface equipment belonging to an interrupt level are set forth in a list that is chained in the manner of a ring. This chained ring-like list is established, for example, by a user program provided for testing the data interfaces on the basis of a data interface table that contains all data interfaces and is deposited in the data base. A counter is provided in the interface sampling routine in order to be able to implement a cyclic sampling of the data interfaces or, respectively, interface equipment of an interrupt level until no information or, respectively, data are present at any of the data interfaces or, respectively, interface equipment. The counter reading of the counter is thereby set to a given number given the presence of information and is modified by a given number given the absence of information i.e. is incremented or deincremented. When the counter reading has a given number, then information are no longer present at a data interface of this interrupt level. Resetting the counter reading to the number "0" given the presence of information and incrementing the counter reading by the number "1" given the absence of information can be advantageously realized in program terms. When, for example, given three interfaces assigned to an interrupt level, a counter reading has the number "3", then no information to be transferred into the intermediate memory are present at any of the data interfaces.

The processor-controlled equipment is particularly advantageously realized as an interface testing device that tests a plurality of interfaces in parallel. The critical advantage may be seen therein that data interfaces having different types of application, for example for information exchange between data terminal equipment and for the administration-oriented or, respectively, reliability-oriented transmission of information are connected to the interface testing device and the different functions can be tested in a single interface testing device, for example a personal computer, on the basis of appropriate user test programs. Since the data interfaces predominantly comprise the physical and procedural properties of the V.24 interface standardized in accordance with the CCITT recommendations, the data interfaces of the interface devices are advantageously realized as V.24 interfaces.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
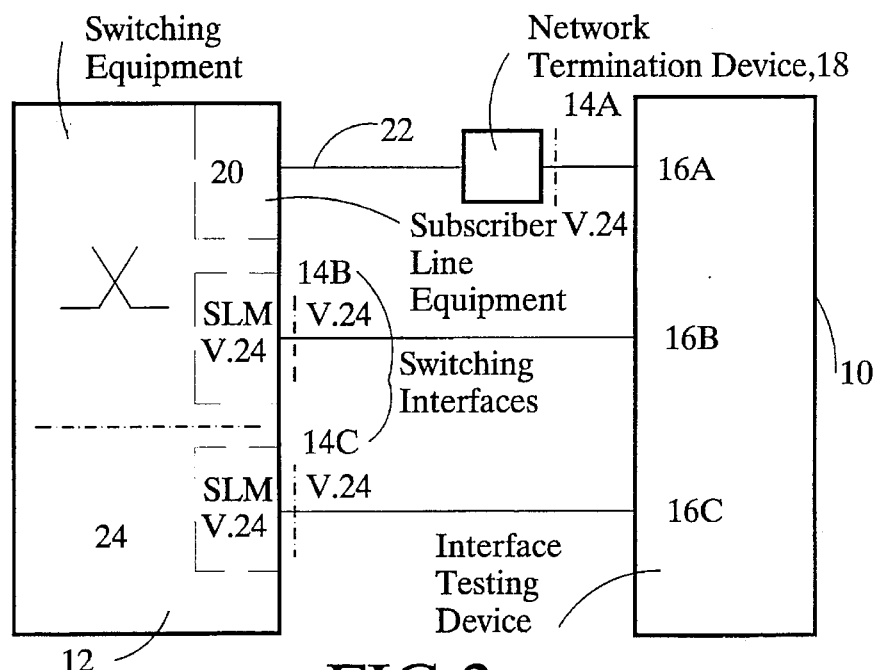
FIG. 1 is a block diagram of the connection of an interface testing device to switching equipment.

In a block circuit diagram, FIG. 1 illustrates the connection of an interface testing device 10 to switching equipment 12. It should be assumed, for this exemplary embodiment, that three data interfaces 14A, 14B and 14C are provided and are realized as V.24 interfaces in the switching equipment 12 and the interfaces are connected to respective V.24 interfaces 16A, 16B and 16C of the interface testing device 10 for the purpose of testing these three data interfaces 14A, 14B and 14C. For example, the first data interface 14A is present at a front-end equipment (network termination device 18) of the switching equipment 12. The network termination device 18 is connected to a digital subscriber equipment 20 of the switching equipment 12 via a subscriber line 22. For the exemplary embodiment, the signaling methods and interfaces implemented in the switching equipment 12 and in the network combination 18 correspond to the CCITT recommendations provided for the ISDN communication system. For example, the ISDN switching equipment HICOM 200 of Siemens AG represents switching equipment 12 having such properties.

The second and third data interfaces 14B and 14C are respectively realized by V.24 subscriber equipment SLM-V.24. It should be also assumed, for the exemplary embodiment discussed herein, that the first and second data interfaces 14A and 14B can be connected to one another with the assistance of a switching network structure (not shown) implemented in the switching equipment 12 for the purpose of data or, respectively, information exchange. The connection of the two data interfaces 14A and 14B is effected with the assistance of call set-up procedures at the data interfaces 14A and 14B or by administration-oriented settings for the purpose of establishing a dedicated line. It should also be assumed for the exemplary embodiment discussed herein that the connection between the first and second data interfaces 14A, 14B is accomplished by an administration-oriented setting or, respectively, input. The third data interface 14C of the switching equipment 12 is provided for these administration-oriented settings or, respectively, inputs. Administration-oriented programs 24 implemented in the switching equipment 12 are initialized or, respectively, influenced by administration-oriented inputs at the third data interface 14C, i.e. a connection from the first data interface 14A to the second data interface 14B is switched via the switching network equipment after an input of appropriate administration oriented inputs.

After the call set-up procedure, test information or, respectively, test data are communicated from the first interface 16A to the second interface 16B with the assistance of the interface testing device 10 which is realized, for example, by a personal computer, whereby the administration-oriented settings via the third interface 16C occur before and during the transmission of the test information or, respectively, test data.

Figure 2:
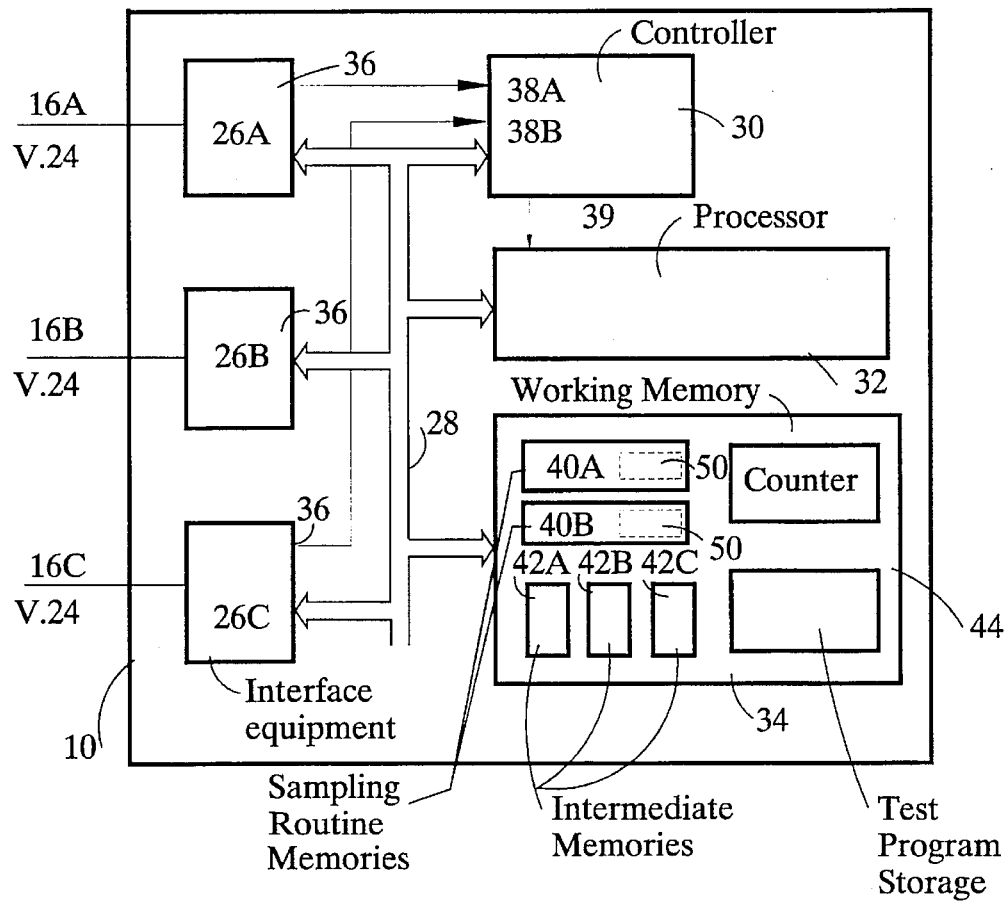
FIG. 2 is a block circuit diagram of an interface testing device.

FIG. 2 shows those components of the interface testing device 10 required for an explanation of the method of the present invention. An interface equipment 26A, 26B and 26C is provided for each of the interfaces 16A, 16B and 16C realized as V.24 interfaces in the interface testing device 10. The interface equipment 26A, 26B and 26C can be realized with commercially-available interface modules, for example with the asynchronous data interface module TMS6011 of Texas Instruments. The serial test information or, respectively, test data present at the interfaces 16A–16C are converted with the assistance of the interface equipment 26A–26C into parallel test information or, respectively, test data matched to a local processor bus 28. The processor bus 28, formed of data, control and address lines, is respectively connected to the interface equipment 26A–26C, to an interrupt controller 30, to a processor device 32, to a working memory 34 and to further equipment of the interface testing device 10 that are not shown on the drawing. In addition, control lines of the V.24 interfaces 16A–16C are influenced in the interface equipment 26A–26C in accordance with the instructions of the processor device 32. Such control lines, for example, represent the interface circuits "connect transmission line" (801/1), "active transmission part" (105) and "data terminal equipment operation" (108/2).

Each of the interface equipment 26A–26C comprises an additional interrupt output 36. The interrupt outputs 36 of the first and second interface equipment 26A and 26B are connected to a first interrupt input 38A of the interrupt controller 30. The interconnection of the interrupt outputs 36 is possible since, beyond two logic states, the interrupt outputs 36 can be additionally driven to the ineffective, e.g. "Tristate" function. The interrupt output 36 of the third interface equipment 26C is connected to a second interrupt input 38B of the interrupt controller 30. Each of the interrupt inputs 38A, 38B of the interrupt controller 30 represents a given interrupt level. This means that the interface equipment 26A, 26B that are allocated to this interrupt input 38A belong to one interrupt level. A different priority is provided in the interrupt controller 30 for each interrupt input 38A, 38B, i.e. given indication of an interrupt, such that an interrupt at the interrupt inputs 38A, 38B that is present with the highest priority at the interrupt input 38A, 38B is reported to the processor 32. Within an interrupt level, interrupt requests having different priorities can be directed to the interrupt controller 30. The different priorities are indicated to the interrupt controller 30 via the processor bus 28, whereby the respective interrupt requests having the highest priority are identified by the interface equipment 26A–26C and are communicated respectively first to the interrupt controller 30. For example, different priorities are provided for the indication of errors in the data transmission via the V.24 interface for the controls of data and signal lines as well as for internal error messages. For example, the interrupt controller 30 may be realized by the integrated circuit SAB82C59A-2 of Siemens AG (CMOS programmable interrupt controller).

With the assistance of the interrupt controller 30, furthermore, the presence of an interrupt, which means the presence of information at one of the three interfaces 16A, 16B and 16C, is indicated to the processor 32 by communicating an interrupt request via an interrupt connection 39. Approximately simultaneously, the processor 32 is informed of the interrupt level assigned to this interrupt by communicating a priority information via the processor bus 28. When, for example, an interrupt request of the first interrupt level is present, a first interface sampling routine 40A stored in the working memory 34 is started. With the assistance of this first interface sampling routine 40A, realized in program-oriented terms, the first interface 16A and the second interface 16B are sampled for the presence of test information or, respectively, test data until test information or, respectively, test data are no longer present. With the assistance of the interface sampling routine 40, the sampled test information or, respectively, test data are transferred into a first intermediate memory 42A or a second intermediate memory 42B depending on the presence of test information or, respectively, test data at the first interface 16A or the second interface 16B. The two intermediate memories 42A, 42B and a third intermediate memory 42C are likewise realized in the working memory 34. The test information or, respectively, test data are transmitted from these intermediate memories 42A–42C to a user test program 44 or, respectively, are called in by the latter. Different user test programs 44 can be loaded into the interface testing device 10 which is realized by a personal computer, for example from a read-only memory.

Since, due to the two wired interrupt inputs 38A and 38B, two interrupt levels are provided in the exemplary embodiment and an interface sampling routine 40A or 40B is to be assigned to each interrupt level, a second, identically-realized interface sampling routine 40B is contained in the working memory 34. Due to the connection to a second interrupt input 38B, the second interrupt level assigned to the third V.24 interface 16C has a higher priority in comparison to the first interrupt level since the administration-oriented settings are undertaken and administration-oriented messages are received via the third V.24 interface. These administration-oriented measures or, respectively, reactions are always to be handled by the interface testing device 10 with priority. A priority handling of a V.24 interface could also be required for testing purposes and can be assigned to each of the three V.24 interfaces 16A–16C. To this end, the interrupt outputs 36 of the interface equipment 26A–26C are merely to be assigned, for example by plug devices, to the desired interrupt levels, i.e. are to be connected to the corresponding interrupt levels 38A, 38B of the interrupt controller 30. Furthermore, more than three V.24 interfaces 16A–16C can be realized in an interface testing device 10, whereby these interfaces can be assigned in parallel to one or more interrupt levels. Since the interrupt controllers 30 usually comprise a plurality of interrupt inputs 38A, 38B, for example eight in the aforementioned integrated circuit SAB82C59A-2, more than the two mentioned interrupt levels can also be provided.

The transmission, evaluation and reception of test information, as well as the control and evaluation of the interface circuits of the three interfaces 16A–16C are implemented with the assistance of the user test program 44.

Figure 3:
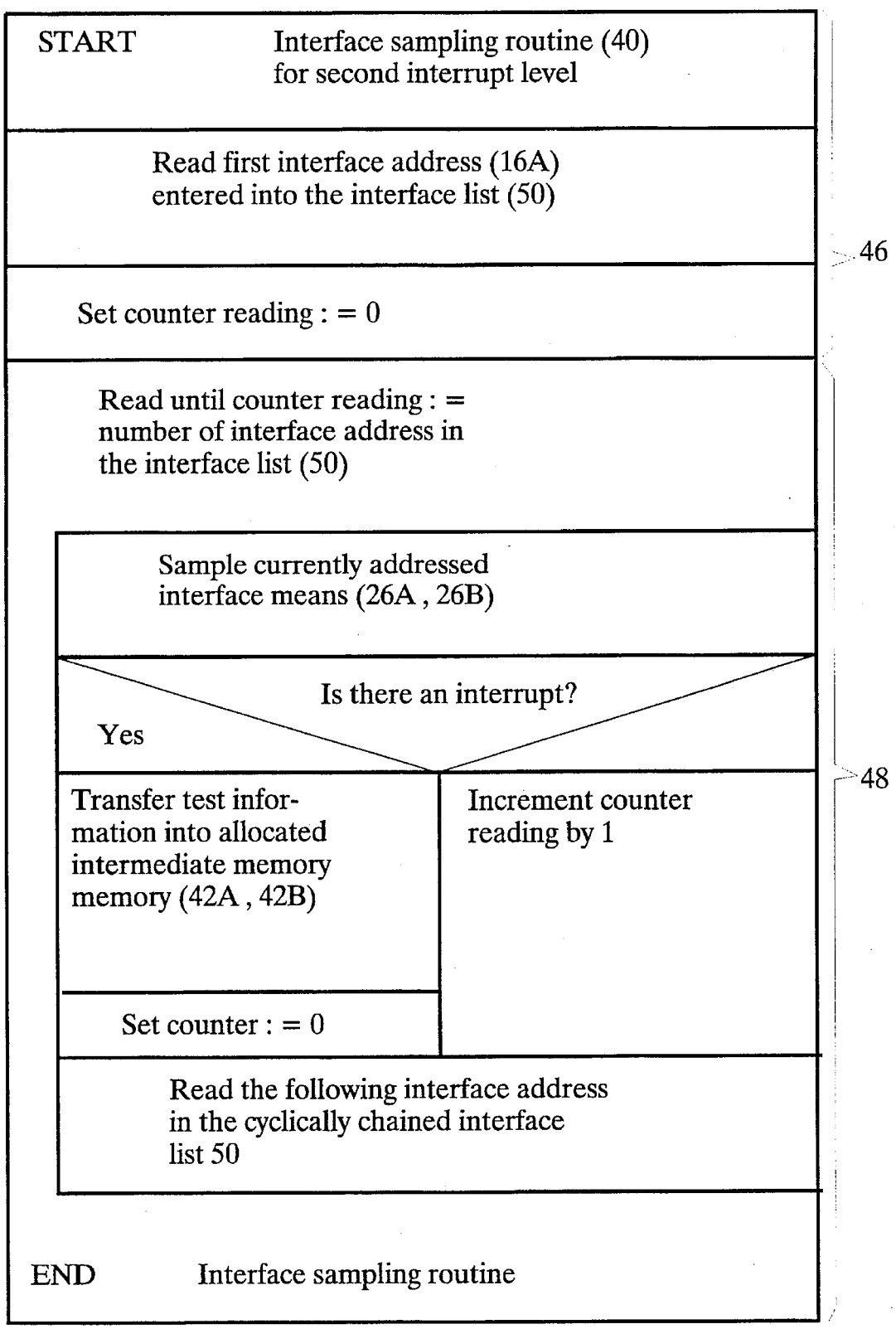
FIG. 3 is a flowchart of an interface sampling routine.

FIG. 3 illustrates a self-explanatory flow chart of the first interface sampling routine 40A. According to the exemplary embodiment, this interface sampling routine 40A is provided for sampling the first interface 16A and the second interface 16B. The first interface sampling routine 40 is activated when the interrupt controller 30 reports an interrupt request of the first interrupt level, i.e. having the first priority, to the processor 32. It is here assumed for the exemplary embodiment that a higher priority is assigned to the second interrupt input 38B. Given an indication that the second interrupt input 38B, i.e. information are present at the third interface 16C, consequently, an interrupt request is formed in the interrupt controller 30 and is communicated to the processor 32. The currently-sequencing interface sampling routine 40A is interrupted with the assistance of the processor 32 and the second interface sampling routine 40B is activated. The second interface sampling routine 40B is ended when test information or, respectively, test data are no longer present at the third interface 16C. Subsequently, the interrupt, first interface sampling routine 40A is further processed with the assistance of the processor 32 until test information or, respectively, test data are no longer present at the first interface 16A or at the second interface 16B.

The interface sampling routine 40A is divided into two control sections, an initialization control section 46 and an interface sampling control section 48. In the initialization control section 46, the initializations specifically associated to interrupt levels, for example establishing the interface list, are undertaken, and the sampling routine is implemented in the sampling control section 48. Together, the two control sections 46 and 48 represent a reentry-invariant utility program. The different interface routines 40A, 40B are realized by establishing different interface lists 50 in the reentry-invariant utility program with the assistance of the user test program 44.

Although we have described our invention by reference to particular illustrative embodiments thereof, many changes and modifications of the invention may become apparent to those skilled in the art without departing from the spirit and scope of the invention. We therefore, intend to include within the patent warranted hereon all such changes and modifications as may reasonably and properly be included within the scope of our contribution to the art.

We claim:

1. A method for transmitting information present at a plurality of serial data interfaces of processor-controlled equipment, in which the data interfaces are constructed in conjunction with interface equipment, each data interface connected to a processor bus which includes control, data and address lines and each data interface comprising an interrupt output which indicates the presence of the information at a data interface, the method comprising the steps of:

assigning each interrupt output to one of interrupt levels by connecting the interrupt output to an input or inputs of an interrupt controlling equipment, wherein each input of the interrupt controlling equipment represents an interrupt level with a defined priority in a defined hierarchy of priorities;

controlling the interrupt requests detected at the inputs of the interrupt controlling equipment successively to a processor in accordance with the interrupt level having the highest priority;

assigning an interface sampling routine in a memory for each interrupt level wherein the interface sampling routine is implemented by an interface list with assistance of a user test program;

defining in the interface list for each interrupt level a ringshaped-chained sampling sequence of the assigned data interfaces;

successively sampling the data interfaces for presence of serial data information in accordance with the interrupt level and with assistance of the interface list and transferring the serial data information to a respective interface memory;

setting at each sampling of a data interface a count of a counter to an initial value in response to the presence of the interrupt request;

changing at each sampling of a data interface the count of the counter for a predetermined value in response to the absence of the serial data information; and finishing the sampling of the data interfaces assigned to the interface sampling routine if a predetermined count is reached.

2. The method of claim 1 wherein the step of assigning an interface sampling routine is implemented by a re-entry invariant utility program formed by an initialization control section that undertakes the initializations specifically associated to the interrupt levels and by an interface sampling control section.

3. The method of claim 2 further comprising the step of:

setting the counter to zero in response to the presence of the serial data information of the current sampled data interface; and incrementing the counter by one in response to the absence of the serial data information of the current sampled data interface.

* * * * *